United States Patent
Wang et al.

(10) Patent No.: US 12,154,476 B2
(45) Date of Patent: Nov. 26, 2024

(54) LUMINANCE ADJUSTMENT METHOD AND DEVICE OF DISPLAY PANEL

(71) Applicant: Wuhan China Star Optoelectronics Semiconductor Display Technology Co., Ltd., Hubei (CN)

(72) Inventors: Yedong Wang, Hubei (CN); Jia Zhang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/780,544

(22) PCT Filed: Mar. 15, 2022

(86) PCT No.: PCT/CN2022/080872
§ 371 (c)(1),
(2) Date: May 27, 2022

(87) PCT Pub. No.: WO2023/164978
PCT Pub. Date: Sep. 7, 2023

(65) Prior Publication Data
US 2024/0177646 A1    May 30, 2024

(30) Foreign Application Priority Data
Mar. 3, 2022 (CN) .......................... 202210202387.3

(51) Int. Cl.
*G09G 3/20* (2006.01)
(52) U.S. Cl.
CPC ... *G09G 3/2074* (2013.01); *G09G 2320/0233* (2013.01); *G09G 2320/041* (2013.01);
(Continued)

(58) Field of Classification Search
CPC ......... G09G 3/2074; G09G 2320/0233; G09G 2320/041; G09G 2320/0686;
(Continued)

(56) References Cited

U.S. PATENT DOCUMENTS

2015/0116384 A1    4/2015    Kim et al.
2016/0293102 A1*  10/2016   Chaji ..................... G09G 3/20
(Continued)

FOREIGN PATENT DOCUMENTS

| CN | 110910826 | 3/2020 |
| CN | 112562587 | 3/2021 |

(Continued)

OTHER PUBLICATIONS

International Search Report and the Written Opinion Dated Jun. 30, 2022 From the International Searching Authority Re. Application No. PCT/CN2022/080872 and its Translation Into English. (18 Pages).

*Primary Examiner* — Adam R. Giesy

(57) ABSTRACT

The present disclosure provides a luminance adjustment method and device of a display panel. In the method, firstly, a difference between the luminance parameters of different regions of the target panel are obtained, and temperatures of different regions of the target panel are obtained according to the difference of the luminance parameters of the different regions of the target panel. Then, luminance compensation parameters of the corresponding regions are obtained according to a correlation of the luminance to the temperature and a difference of the operating temperatures of the different regions, and finally, the luminance of a corresponding region is compensated according to the luminance compensation parameters.

20 Claims, 4 Drawing Sheets

(52) U.S. Cl.
CPC ............... *G09G 2320/0626* (2013.01); *G09G 2320/0686* (2013.01)

(58) Field of Classification Search
CPC ................... G09G 3/3208; G09G 5/10; G09G 2320/0626; Y02B 20/40
See application file for complete search history.

(56) References Cited

U.S. PATENT DOCUMENTS

| | | | |
|---|---|---|---|
| 2021/0225287 A1* | 7/2021 | Meng ................... | G09G 3/3291 |
| 2024/0054950 A1* | 2/2024 | Hou ..................... | G09G 3/3208 |

FOREIGN PATENT DOCUMENTS

| | | |
|---|---|---|
| CN | 112825232 | 5/2021 |
| CN | 113628575 | 11/2021 |
| CN | 114093323 | 2/2022 |
| CN | 114120906 | 3/2022 |

\* cited by examiner

LUMINANCE ADJUSTMENT METHOD AND DEVICE OF DISPLAY PANEL

RELATED APPLICATIONS

This application is a National Phase of PCT Patent Application No. PCT/CN2022/080872 having International filing date of Mar. 15, 2022, which claims the benefit of priority of Chinese Patent Application No. 202210202387.3 filed on Mar. 3, 2022. The contents of the above applications are all incorporated by reference as if fully set forth herein in their entirety.

FIELD AND BACKGROUND OF THE INVENTION

The present disclosure relates to the display field, and in particular to a luminance adjustment method of a display panel and a luminance adjustment device of a display panel.

With the development of science and technology and the increasing requirement for products, the full-screen product with a high screen-to-body ratio has become a promising development trend of smartphones, and therefore, a technology of under-panel camera (or camera under-panel) is particularly important.

However, in a conventional display panel having the under-panel camera, since film layer structures stacked in an under-panel camera area are less than film layer structures stacked in an active area (or a main display area) in order to ensure the transmittance of the under-panel camera area in the panel, the heat dissipation effect of the under-panel camera area is superior to that of the active area. However, the performance of a thin film transistor varies with different temperatures. For example, as the ambient temperature of the thin film transistor increases, the performance of the thin film transistor in the active area deteriorates greatly because the heat dissipation effect of the under-panel camera area is superior to that of the active area, resulting in the luminance of the active area being lower than that of the under-panel camera area, thereby reducing the display uniformity of the display panel.

SUMMARY

The present disclosure provides a luminance adjustment method and a luminance adjustment device of a display panel, so as to solve a technical problem that in an existing display, luminance of an under-panel camera area is inconsistent with luminance of an active area.

The present disclosure provides a luminance adjustment method of a display panel, including:
  obtaining a first luminance parameter of a first region of a target panel and a second luminance parameter of a second region of the target panel;
  when a first difference between the first luminance parameter and the second luminance parameter is greater than or equal to a first threshold, obtaining a first operating temperature of the first region of the target panel and a second operating temperature of the second region of the target panel;
  when a second difference between the first operating temperature and the second operating temperature is greater than or equal to a second threshold, obtaining a correlation of luminance to temperature, and obtaining a luminance compensation parameter of the first region or the second region according to the second difference and the correlation of the luminance to the temperature;
  compensating luminance of the first region or the second region according to the luminance compensation parameter of the first region or second region.

The present disclosure further provides a display panel including:
  a luminance obtaining unit configured to obtain a first luminance parameter of a first region of a target panel and a second luminance parameter of a second region of the target panel;
  a temperature obtaining unit configured to obtain a first operating temperature of the first region of the target panel and a second operating temperature of the second region of the target panel when a first difference between the first luminance parameter and the second luminance parameter is greater than or equal to a first threshold;
  a signal processing unit configured to, when a second difference between the first operating temperature and the second operating temperature is greater than or equal to a second threshold value, obtain a correlation of luminance to temperature and a luminance compensation parameter of the first region or the second region according to the correlation of the luminance to the temperature and the second difference value;
  a compensation range register configured to store the luminance compensation parameter of the first region or the second region;
  a luminance compensation unit configured to compensate luminance of the first region or the second region according to the luminance compensation parameter of the first region or the second region.

In the present disclosure, the luminance of the target region is compensated by measuring the temperature difference between different regions of the target panel and the correlation of the luminance to the temperature, so that the luminance of the target panel is the same in different regions, and the display uniformity of the target panel is ensured.

DESCRIPTION OF SPECIFIC EMBODIMENTS OF THE INVENTION

In order to make the objectives, technical solutions and effects of the present disclosure clearer and more specific, the present disclosure will be described in further below with reference to the accompanying drawings and embodiments. It should be understood that the specific embodiments described herein are merely intended to explain the present disclosure and are not intended to limit the present disclosure.

Figure 1:
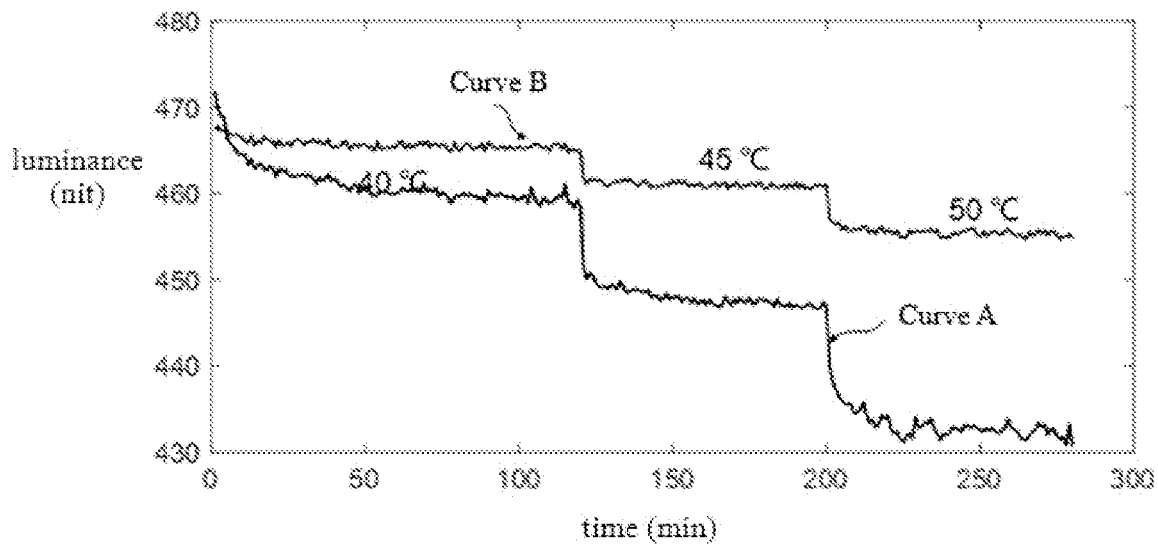
FIG. 1 is a graph of luminance at different temperatures of an active area and an under-panel camera area in a conventional display panel.

Due to the difference between a structure of an under-panel camera area and a structure of an active area in a conventional display panel, the heat dissipation effect of the under-panel camera area is better than that of the active area, that is, the performance of a thin film transistor in the active area is deteriorated greatly, which causes the luminance of the active area to be lower than that of the under-panel camera area. Specifically, referring to a graph shown in FIG. 1, a curve A shows a change curve of the luminance of the active area with the time, and a curve B shows a change curve of the luminance of the under-panel camera area with the time. When an operating temperature is 40° C., the luminance difference between the active area and the under-panel camera area is small, and as the temperature increases, the luminance difference between the active area and the under-panel camera area gradually increases. When the operating temperature is 50° C., the luminance difference between the active area and the under-panel camera area reaches 27 nits. Therefore, the following technical solutions are provided to solve the above technical problems.

Figure 2:
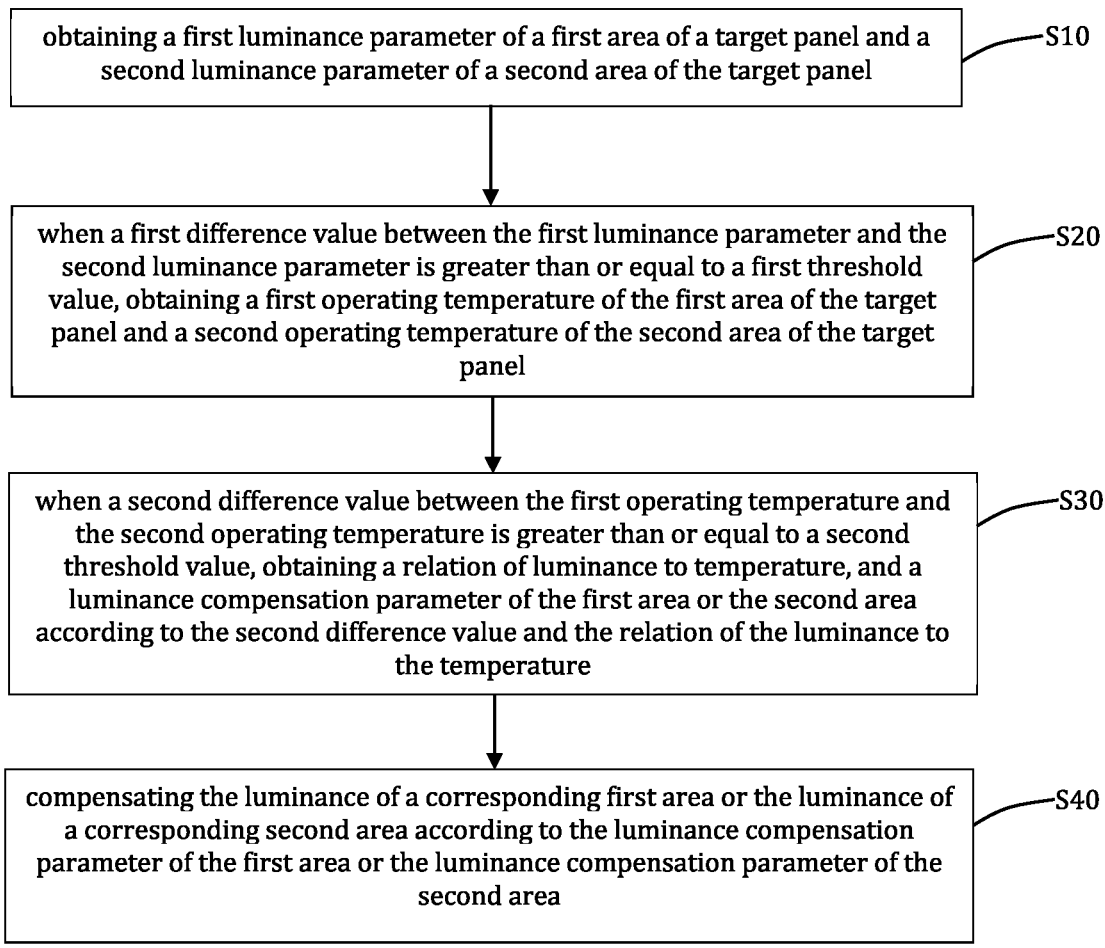
FIG. 2 is a diagram showing steps of a luminance adjustment method of a display panel according to the present disclosure.

Referring to FIG. 2, the present disclosure provides a method for adjusting luminance of a display panel, which includes:

S10: obtaining a first luminance parameter of a first region of a target panel 100 and a second luminance parameter of a second region of the target panel 100;

S20: when a first difference value between the first luminance parameter and the second luminance parameter is greater than or equal to a first threshold value, obtaining a first operating temperature of the first region of the target panel 100 and a second operating temperature of the second region of the target panel 100;

S30: when a second difference value between the first operating temperature and the second operating temperature is greater than or equal to a second threshold value, obtaining a correlation of luminance to temperature, and a luminance compensation parameter of the first region or the second region according to the second difference value and the correlation of the luminance to the temperature;

S40: compensating the luminance of a corresponding first region or the luminance of a corresponding second region according to the luminance compensation parameter of the first region or the luminance compensation parameter of the second region.

In the present disclosure, the luminance of a target region is compensated by measuring the temperature difference value of different regions in the target panel 100 and based on the correlation between the temperature and the luminance, so that the luminance of the target panel 100 is the same in different regions, and the display uniformity of the target panel 100 is ensured.

It should be noted that for the luminance difference between the different regions, the luminance of the high luminance region may be negatively compensated according to the luminance difference, that is, the luminance of the high luminance region is reduced, or the luminance of the low luminance region may be positively compensated according to the luminance difference. However, since the display luminance of the display panel has a certain decay over time, the embodiment of the present disclosure will be described by taking the case where the luminance of the low luminance region is positively compensated according to the luminance difference as an example.

Figure 3:
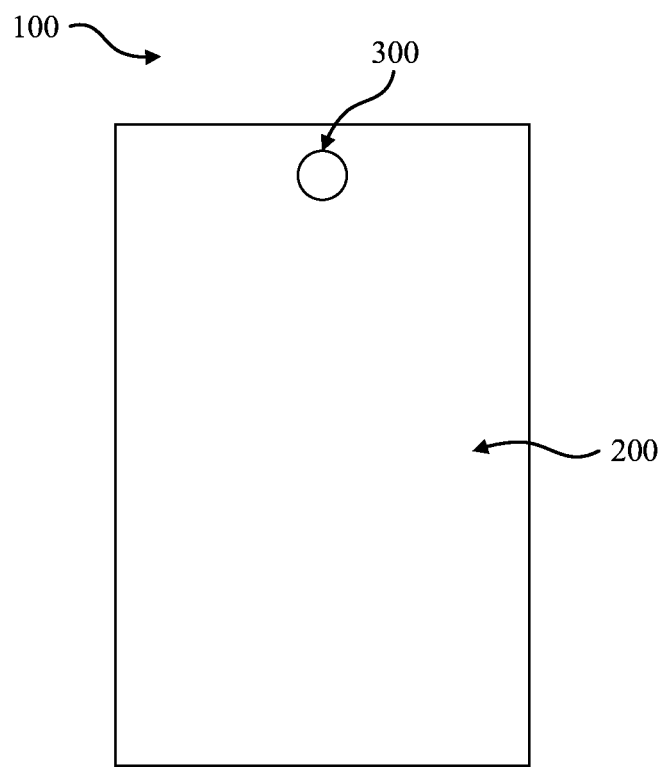
FIG. 3 is a schematic diagram of a first structure of a display panel according to the present disclosure.

It should be noted that, referring to FIG. 3, the target panel 100 may include a functional addition area 300 and an active area 200 on a periphery of the functional addition area 300. The functional addition area 300 may be an under-panel camera area or other functional areas requiring high light transmittance. The present disclosure is described by taking the under-panel camera area as an example.

It should be noted that the first region and the second region may be any region of the target panel 100, for example, the first region and the second region may both be in the active area 200 of the target panel 100, or the first region and the second region may both be in the functional addition area 300 of the target panel 100, or the first region may be in the active area 200 of the target panel 100, and the second region may be in the functional addition area 300 of the target panel 100.

It should be noted that, although there is a temperature difference in the active area 200, since the difference between various film layer structures in the active area 200 is small, the temperature difference between different regions in the active area is small. Therefore, in the following embodiment(s), as an example for description, the first region is the active area 200, and the second region is the functional addition area 300.

It should be noted that, light emitted by the organic light emitting display panel is determined by the magnitude of the current passing through the light emitting device, and the calculation formula (1-1) of the magnitude of the current is as follows:

$$I = \frac{1}{2}\mu_n C_{ox} \frac{W}{L}(V_{data} - V_{power} - V_{th})^2 \quad (1\text{-}1)$$

Due to the variation of the operating temperatures in the display panel, Vth of the active area and Vth of the under-panel camera area are varied. In order to ensure the uniformity of the luminance of the active area and the under-panel camera area without considering the luminance difference caused by the sub-pixel arrangement, it is necessary to satisfy the formula (1-2):

$$V_{datacup} - V_{thcup} = V_{dataAA} - V_{thAA} \quad (1\text{-}2)$$

That is, an input voltage of a data line is adjusted to eliminate the luminance difference between the active area and the under-panel camera area caused by Vth.

In addition, formula (1-2) may be written as follows:

$$V_{data\_offset} = V_{datacup} - V_{dataAA} = V_{thcup} - V_{thAA} \quad (1\text{-}3)$$

Since Vth is greatly affected by the temperature variation, the difference variation $V_{thcup} - V_{thAA}$ may be written as a variate mainly affected by the temperature, and the compensation formula may be written as follows:

$$V_{data\_offset} = f(T) \quad (1\text{-}4)$$

Therefore, the present disclosure needs to establish a compensation model of the temperature and the compensation voltage, and may compensate the low luminance region according to the operating temperature obtained in real time, so as to improve the technical problem of the luminance difference between different regions of the display panel.

The technical solution of this application is described below in accordance with specific embodiments.

In the luminance adjustment method of the present disclosure, the step S10 may include:

S101: obtaining the first luminance parameter of the target panel 100 in the functional addition area 300; and S102: obtaining the second luminance parameter of the target panel 100 at any position in the active area 200.

In the present embodiment, the order of obtaining the first luminance parameter and the second luminance parameter is not limited in this application.

In the present embodiment, the first luminance parameter and the second luminance parameter may include a luminance value, a grayscale, a grayscale voltage, and a pixel voltage. For example, the first luminance value of the target panel 100 in the functional addition area 300 and the second luminance value at any position in the active area 200 are obtained by photographing or other auxiliary devices, or the grayscale, the grayscale voltage, the pixel voltage and the like inputted to the corresponding area are directly obtained by external devices, as long as the relevant parameters may reflect the luminance difference between the active area 200 and the functional addition area 300, they are all applicable to the present embodiment.

In the luminance adjustment method of the present disclosure, the step S20 may include:

S201: obtaining the first difference value between the first luminance parameter and the second luminance parameter;

S202: when the first difference value is greater than or equal to the first threshold, obtaining the first operating temperature of the first region of the target panel 100 and the second operating temperature of the second region of the target panel 100; and S203: when the first difference value is less than the first threshold value, the target panel 100 is displayed normally.

In the present embodiment, although the temperature difference in different areas of the target panel 100 may lead to the difference in the performance of the thin film transistor, the most directly related difference is in the display luminance of the panel; for example, the luminance value of the first region is 300 nits, and the luminance value of the second region is 303 nits, while the luminance difference of the 3 nits may not cause a uniformity difference in the user experience, and this difference value is within an allowable difference range; for example, when the luminance difference is 10 nits or more, it may cause the uniformity problem of the display luminance.

In the present embodiment, the value of the first threshold is not limited, and may be set according to the user's requirements or other standards.

In the present embodiment, the step of obtaining the first operating temperature of the first region of the target panel 100 and the second operating temperature of the second region of the target panel 100 may include:

S2021: in a current measurement period, obtaining a plurality of first measured temperatures of the first region of the target panel 100 and a plurality of second measured temperatures of the second region of the target panel 100 by a temperature detection unit; and S2022: processing the plurality of first measured temperatures and the plurality of second measured temperatures using a mathematical model to obtain the first operating temperature of the first region of the target panel 100 and the second operating temperature of the second region of the target panel 100 during the current period.

In the present embodiment, the position of the temperature detection unit is not limited in the present disclosure, and since there are a large number of metal lines on the array substrate side of the display panel and the thin film transistor is greatly affected by the temperature, the temperature detection unit(s) may be arranged on the array substrate side of the display panel.

In the present embodiment, the measurement of the operating temperature has a certain difference, and therefore the measurement of the real-time operating temperature has a large error; in addition, the panel may compensate the luminance of the low luminance region only after the temperature measurement result is obtained, which has a certain delay. Therefore, the technical solution of the present disclosure is generally to measure the temperature of the current period, and compensate the luminance of a next measurement period according to the temperature measurement result of the current measurement period.

In the present embodiment, duration of the measurement period may be set according to user's requirements or related standards. For example, in the present disclosure, a measurement period of 30 s is used, the temperature detection unit may detect the operating temperature of the panel once at intervals of 1 s, 2 s or 3 s, and the specific detection frequency may be set according to the user's requirement or the load of the processor. In the present disclosure, the operating temperature of the panel may be detected once at intervals of 2 s, so that 15 measured temperatures may be obtained within one measurement period, and the operating temperatures of different areas in the current measurement period may be obtained later by using the corresponding mathematical model.

In the present embodiment, the step of processing a plurality of first measured temperatures and a plurality of second measured temperatures using a mathematical model includes:

removing a maximum measured temperature and a minimum temperature from the plurality of first measured temperatures to obtain a first group of measured temperatures, and removing a maximum measured temperature and a minimum temperature from the plurality of second measured temperatures to obtain a second group of measured temperatures; and taking an average value of the first group of measured temperatures as the first operating temperature of the first region in the current period, and taking an average value of the second group of measured temperatures as the second operating temperature of the second region in the current period.

In the present embodiment, due to the existence of the operating temperature measurement error, it is generally possible to remove the maximum and minimum measured temperatures measured in one measurement period, and to take the average value of the remaining plurality of measured temperatures as the operating temperature of the current measurement period; for example, in a measurement period of 30 s, a total of 15 measurement operating temperatures are obtained at an interval of 2 s, a maximum value and a minimum value among the 15 measurement operating temperatures are removed, and an average value of the remaining 13 measurement operating temperatures is taken as the operating temperature in the current measurement period to compensate the luminance in a next measurement period.

In the luminance adjustment method of the present disclosure, step 30 may include:

S301: obtaining the second difference value between the first operating temperature and the second operating temperature;

S302: when the second difference value is greater than or equal to the second threshold value, obtaining the correlation of the luminance to the temperature; and S303: obtaining the luminance compensation parameter of the first region or the second region based on the second difference value according to the correlation of the luminance to the temperature.

In the present embodiment, the value of the second threshold is not limited, and may be set according to the user's requirements or other standards.

In the luminance adjustment method of the present disclosure, the step of obtaining the correlation of the luminance to the temperature includes:

S3021: obtaining luminance parameters of the first regions and the second regions of a plurality of test panels at different operating temperatures;

S3022: obtaining luminance compensation parameters corresponding to the different operating temperatures according to the luminance parameters of different areas;

S3023: according to the luminance compensation parameters corresponding to the different operating temperatures, obtaining correlation curves between the operating temperatures and the luminance compensation parameters of the plurality of test panels; and S3024: obtaining the correlation of the luminance to the temperature according to the correlation curves between the operating temperatures and the luminance compensation parameters of the plurality of test panels.

In the present embodiment, the correlation between the temperature and the luminance may be obtained according to the measurements of the plurality of panels in the same series, for example, a plurality of test panels are randomly selected to measure luminance parameters and operating temperatures of each test panel in different areas, and the luminance parameter may be display luminance value of the test panel.

For example, taking a certain test panel as an example, firstly, at the operating temperature of 25□, the luminance value $L_1$ of the first region and the luminance value $L_2$ of the second region are obtained. The first region may be the active area 200, and the second region may be the functional addition area 300.

Next, the grayscale compensation values corresponding to different operating temperatures are obtained according to formula $B=(L_1/L_2)^{\wedge}(1/2.2)*255-255$, wherein the parameter B is the grayscale compensation value.

In the present embodiment, the compensation value B1 at the operating temperature of 25□ may be obtained according to the above steps, and then the compensation values B2 to B5 corresponding to 30□, 35□, 40□, 45□ are continuously measured at intervals of 5 respectively. The six sets of data are fitted into the curve of Panel 1 shown in FIG. 4; the above steps are repeated while the curves of Pane 2 to Panel 10 as shown in FIG. 4 are obtained.

In the present embodiment, the temperature interval is not limited to 5□, which may be set according to the accuracy or user's requirements, and the smaller the temperature interval, the higher the accuracy of the curve.

Figure 4:
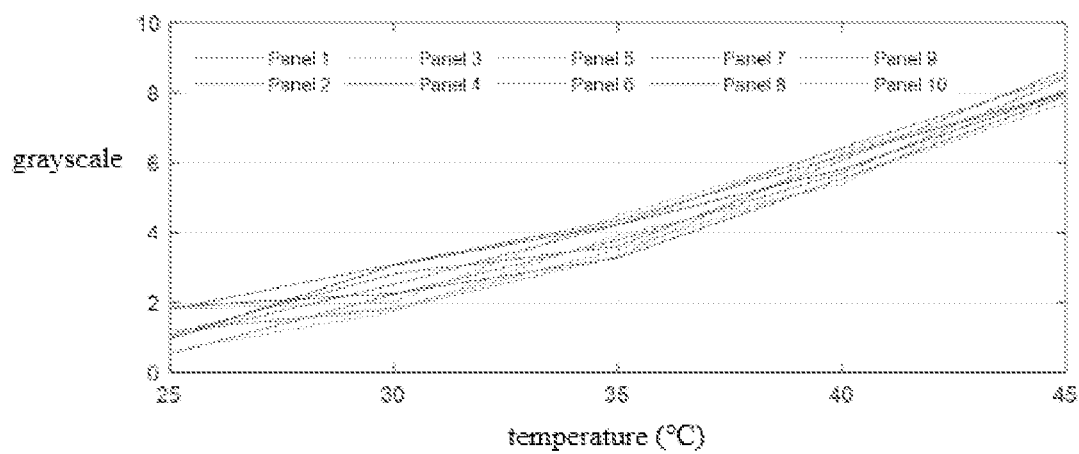
FIG. 4 is a graph of temperatures versus grayscale values in the luminance adjustment method of the display panel according to the present disclosure.

In the present embodiment, the 10 curves in FIG. 4 are fitted into a curve applicable to a plurality of test panels, which is used as a general correlation curve between the temperature and the luminance.

In the present embodiment, when the ratio of $L_1/L_2$ is greater than 1, B is a positive number, and the luminance of the functional addition area 300 needs to be compensated. When the ratio of $L_1/L_2$ is less than 1, B is a negative number, and the luminance of the active area 200 needs to be compensated. In the present embodiments, the ratio of $L_1/L_2$ may be less than 1.

In the present embodiment, the compensation of the luminance is generally realized by adjusting the grayscale voltage, and therefore, even if the luminance value or the grayscale value is measured, it is necessary to convert the luminance value or the grayscale value to the grayscale voltage.

In the present embodiment, when the second difference value is less than the second threshold, that is, the difference in luminance occurs, even it is small, which may be caused by other reasons such as capacitance and resistance, and is not discussed in the present disclosure.

In the luminance adjustment method of the present disclosure, since it is usually necessary to compensate the luminance value of the low luminance area according to the high luminance area, for example, for a panel having a maximum luminance value of 500 nits, when the active area 200 and the functional addition area 300 both display the luminance corresponding to the grayscale of 250, the luminance of the functional addition area 300 is 495 nits, and the luminance of the active area 200 is 460 nits. According to the above compensation principle, the active area 200 needs to be compensated from 460 nits to 495 nits, but at this time, the active area 200 may only be compensated to a grayscale of 255, and the luminance corresponding to the grayscale of 255 may not make the luminance of the active area 200 reach 495 nits. Therefore, before the luminance compensation, the compensation space (or compensation range) needs to be reserved.

In the present embodiment, before the step of obtaining the luminance compensation parameters corresponding to the different operating temperatures according to the luminance parameters of different areas, the method further includes:
obtaining a measured luminance peak value of a plurality of test panels;
adjusting measured luminance peak values of the plurality of test panels to a target luminance peak value according to a compensation peak value of the luminance compensation parameters; and
setting the target luminance peak value of the test panels as a luminance peak value of the target panel 100.

In the present embodiment, since there are different luminance compensation parameters at different temperatures, when the luminance compensation parameters are larger, and the luminance value to be compensated may be larger than the corresponding grayscale value and exceed the compensable threshold space (or threshold range), the present embodiment increases the compensable threshold space of the test panel according to the maximum luminance compensation parameter in the test panel.

In the present embodiment, firstly, obtaining the measured luminance peak values Lmax of the plurality of test panels and the compensation peak values Bmax of the luminance compensation parameters of the plurality of test panels; next, adjusting the measured luminance peak values of the plurality of test panels to the target luminance peak value according to the formula $BT=((255+Bmax)/255)^{\wedge}2.2*Lmax$, wherein the parameter BT is the target luminance peak value.

For example, the luminance compensation parameter is represented by the grayscale compensation value, if the measured luminance peak value of the plurality of test panels is 500 nits, and the grayscale compensation peak value of the plurality of test panels is 10 grayscales, an available compensation peak luminance of the test panel is $((255+10)/255)\char`\^2.2*500$ nits, and an increased compensation space of the test panel is $(((255+10)/255)\char`\^2.2*500-500)$ nits.

In the present embodiment, after the reservation of the compensation space is completed, it is further necessary to remap each grayscale value and each luminance value of the display panel using the Gamma curve. For example, the luminance value corresponding to the original grayscale of 255 is mapped from the original 500 nits to $(255+10/255)\char`\^2.2*500$ nits, and the luminance value corresponding to each grayscale is correspondingly increased. When the luminance of the functional addition area 300 is 495 nits, and the luminance of the active area 200 is 460 nits, the grayscale value of the active area 200 may be updated from the original grayscale value of 250 to the grayscale value of 240, leaving the compensation space of 15 grayscales. When the active area 200 is compensated from 460 nits to 495 nits, in a new mapping table, the grayscale value corresponding to 495 nits is the grayscale value of 250, thus, it is necessary to increase the luminance value of the display area by 10 grayscales, so that the luminance uniformity of the active area 200 and the functional addition area 300 may be ensured.

Figure 5:
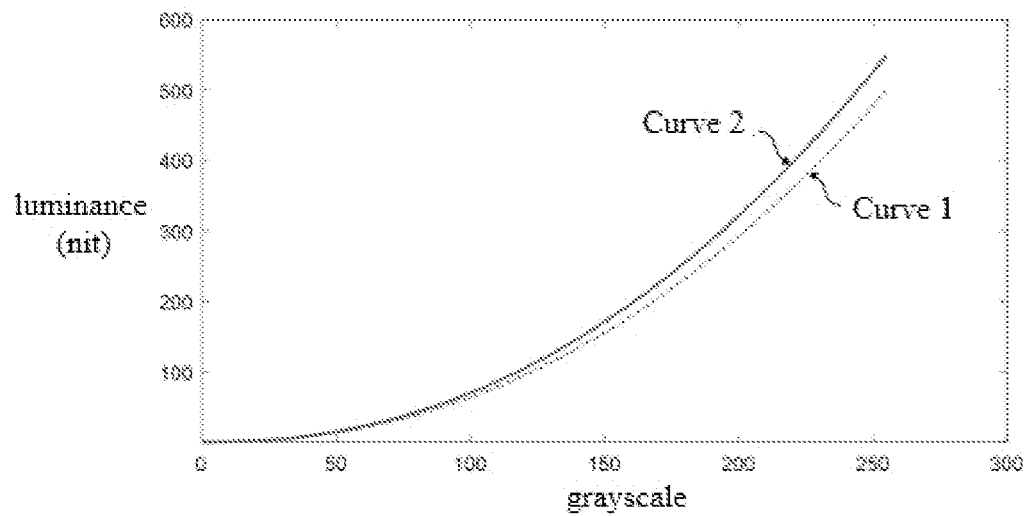
FIG. 5 is a diagram showing Gamma curves before and after compensation in the luminance adjustment method of the display panel according to the present disclosure.

In the present embodiment, referring to FIG. 5, the curve 1 in FIG. 5 is the correlation curve between the original luminance and the grayscale, and the curve 2 in FIG. 5 is the correlation curve between the luminance and the grayscale after the remapping. In the curve 2, the 500 nits corresponding to the grayscale value of 255 is mapped to correspond to the grayscale of 239, and mapping is performed according to the corresponding formula for the other grayscale values.

In the present embodiment, due to the existence of inaccuracy of the compensation peak value, a certain amount of compensation value may be added to the obtained compensation peak value. For example, in the above-described embodiment, the grayscale compensation peak value of the plurality of test panels is 10 grayscales, and 2 grayscale values may be added when calculating the compensation peak luminance.

In the present embodiment, since the luminance compensation is to increase the luminance of each sub-pixel, and there is also uniformity between the luminance of respective sub-pixels, the luminance value in the above embodiment may be an average value of respective area.

In the present embodiment, since the area of the active area 200 is far larger than that of the functional addition area 300, and the active area 200 presents different luminance values in different regions due to the in-plane resistance and capacitance, or other reasons, the active area 200 may be divided to perform the luminance compensation; for example, in a region far away from the signal emitting end and a region near the signal emitting end, there is a certain difference in luminance due to the wire impedance, and thus different correlation curves of luminance and grayscale may be obtained for the comparison between different regions and the functional addition area 300 when testing the test panel, that is, the region far away from the signal emitting end may correspond to a first correlation curve of luminance and grayscale, and the region near the signal emitting end may correspond to a second correlation curve of luminance and grayscale.

In the present embodiment, for example, when both the first region and the second region are in the active area 200 of the target panel 100, due to the display luminance difference between different regions of the display panel or the difference in wiring in different regions, for example, the arrangement of the fan-out wires close to the end is relatively dense, the difference in the operating temperature between the different regions of the active area 200 may occur, thereby causing different luminance in the active area 200.

Figure 6:
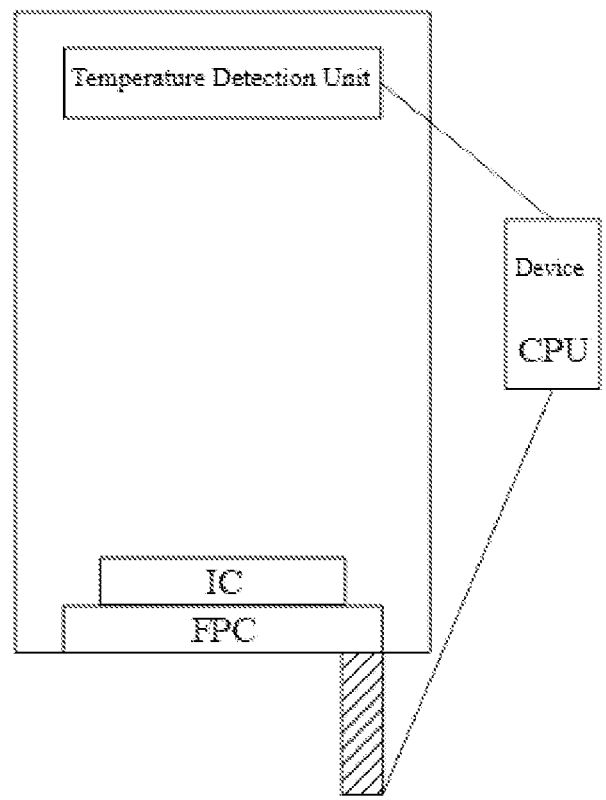
FIG. 6 is a schematic diagram of a second structure of a display panel according to the present disclosure.

In the present embodiment, referring to FIG. 6, a temperature detection unit(s) is provided near the under-panel camera area of the target panel to obtain the operating temperatures of the target panel in real time, and transmit the obtained temperatures to a driving chip of the display panel, and the driving chip compensates the luminance of the under-panel camera area according to the received temperature data.

Figure 7:
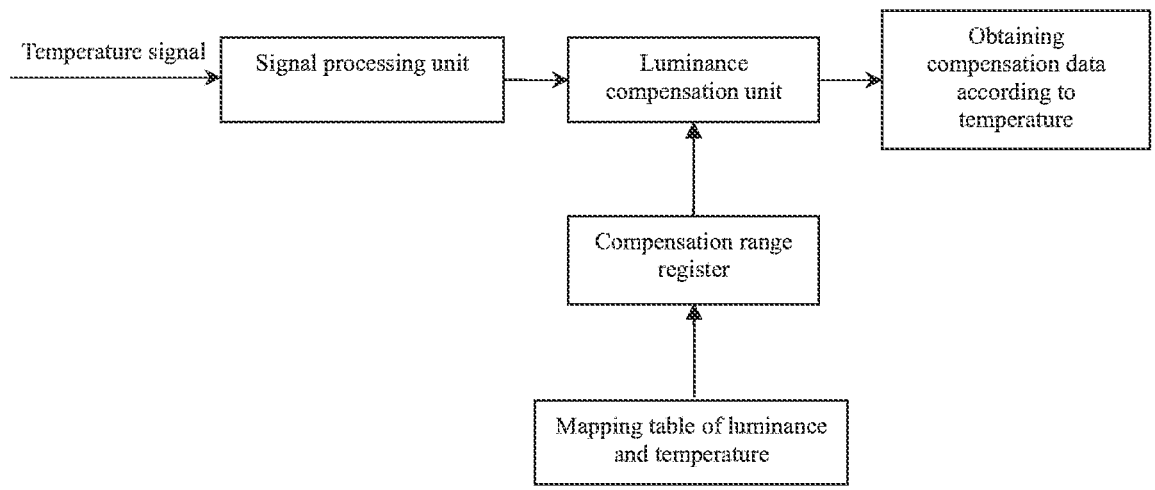
FIG. 7 is a flowchart of a luminance adjustment method of the display panel according to the present disclosure.

The specific operating process is shown in FIG. 7, which is a block diagram showing the luminance adjustment of the display panel of the present disclosure. Before the target panel 100 performs the luminance adjustment, it is necessary to write the correlation curve between the temperature and the luminance into the compensation range register of the panel, that is, the mapping table between the temperature and the luminance; at the same time, the temperature detection unit is turned on, for example, the temperature is sampled at a time interval of 2 s, the temperatures within 30 s are then selected as the temperature values during the measurement period, a temperature value signal(s) is sent to the processor of the panel, that is, in the luminance compensation unit, a luminance compensation value for an area to be compensated during a next measurement is obtained through the mapping table of the temperature and the luminance in the compensation range register and in combination with the measured temperature difference. Finally, the temperatures of different regions are monitored in real time to compensate the luminance of the low luminance region, and the luminance compensation is performed mainly by applying grayscale voltage compensation to the region to be compensated.

Figure 8:
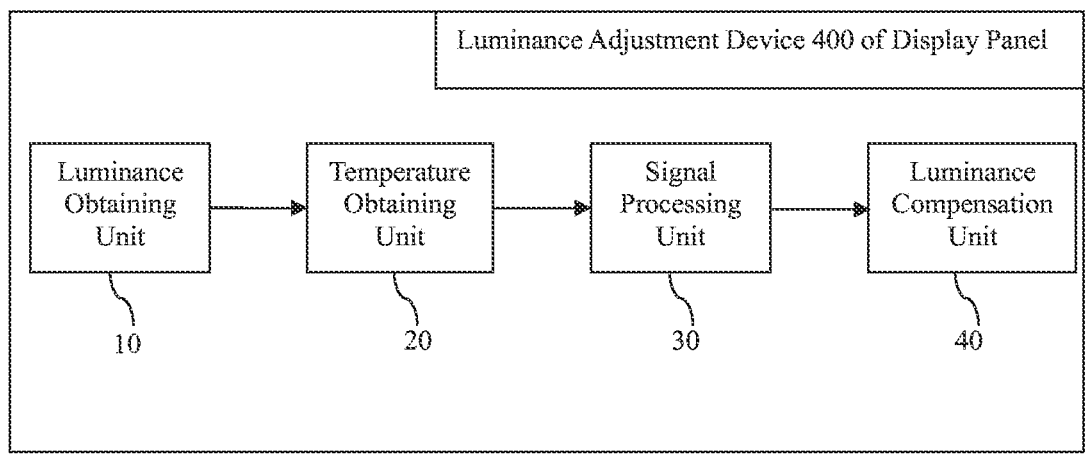
FIG. 8 is a schematic structural diagram of a device for adjusting luminance of a display panel according to the present disclosure.

Referring to FIG. 8, the present disclosure further provides a luminance adjustment device 400 for a display panel, including:

a luminance obtaining unit 10 configured to obtain a first luminance parameter of a first region of a target panel and a second luminance parameter of a second region of the target panel;

a temperature obtaining unit 20 configured to obtain a first operating temperature of the first region of the target panel and a second operating temperature of the second region of the target panel when a first difference between the first luminance parameter and the second luminance parameter is greater than or equal to a first threshold value;

a signal processing unit 30 configured to obtain a correlation of the luminance to the temperature, and a luminance compensation parameter of the first region or the second region according to the second difference and the correlation of the luminance to the temperature, when the second difference between the first operating temperature and the second operating temperature is greater than or equal to the second threshold;

a compensation range register configured to store the luminance compensation parameter of the first region or the second region; and a luminance compensation unit 40 configured to compensate the luminance of a corresponding first region or a corresponding second region according to the luminance compensation parameter of the first region or the second region.

In the present embodiment, the compensation range register is further used to store the correlation of the luminance to the temperature, that is, a mapping table between the temperature and the luminance.

The luminance adjustment device 400 of the display panel of the present disclosure is further configured to: obtain a plurality of first measured temperatures of the first region of the target panel and a plurality of second measured temperatures of the second region of the target panel by the temperature detection unit during the current measurement period; process the plurality of first measured temperatures and the plurality of second measured temperatures using a mathematical model to obtain the first operating temperature of the first region of the target panel within the current period and the second operating temperature of the second region of the target panel within the current period.

The luminance adjustment device 400 of the display panel of the present disclosure is further configured to: remove a maximum measured temperature and a minimum temperature from the plurality of first measured temperatures to acquire a first group of measured temperatures, and to remove a maximum measured temperature and a minimum temperature from the plurality of second measured temperatures to acquire a second measured temperature group; take an average of the measured temperatures of the first group as the first operating temperature of the first region during the current period, and take an average of the second measured temperature group as the second operating temperature of the second region during the current period.

The luminance adjustment device 400 of the display panel of the present disclosure is further configured to: obtain luminance values of the first region and the second region of the plurality of test panels at different operating temperatures; obtain luminance compensation parameters corresponding to different operating temperatures according to luminance parameters of different regions; obtain a correlation curve between the operating temperatures and the luminance compensation parameters of a plurality of test panels according to luminance compensation parameters corresponding to different operating temperatures; obtain the correlation of the luminance to the temperature according to the correlation curve between the operating temperatures and the luminance compensation parameters of the plurality of test panels.

The luminance adjustment device 400 of the display panel of the present disclosure is further configured to: obtain a luminance value $L_1$ of the first region and a luminance value $L_2$ of the second region; obtain the grayscale compensation values corresponding to different operating temperatures according to a formula $B=(L_1/L_2)^{\wedge}(1/2.2)*255-255$, wherein the parameter B is the grayscale compensation value.

The luminance adjustment device 400 of the display panel of the present disclosure is further configured to: obtain a measured luminance peak value of a plurality of test panels; adjust measured luminance peak values of the plurality of test panels to a target luminance peak value according to a compensation peak value of the luminance compensation parameters; set the target luminance peak value of the test panels as a luminance peak value of the target panel.

The luminance adjustment device 400 of the display panel of the present disclosure is further configured to: obtain a measured luminance peak value Lmax of a plurality of test panels and a compensation peak value Bmax of the luminance compensation parameters; adjust the measured luminance peak values of the plurality of test panels to the target luminance peak value according to the formula $BT=((255+Bmax)/255)^{\wedge}2.2*Lmax$, wherein the parameter BT is the target luminance peak value.

The luminance adjustment device 400 of the display panel of the present disclosure is further configured to: obtain a first luminance parameter of the functional addition area 300 of the target panel; obtain a second luminance parameter at any position of the active area of the target panel.

In the luminance adjustment apparatus 400 of the display panel of the present disclosure, the first luminance parameter and the second luminance parameter include a luminance value, a grayscale, a grayscale voltage, and a pixel voltage.

It may be understood that, for those ordinary skilled in the art, equivalent replacements or changes may be made according to the technical solutions and inventive concepts of the present disclosure, and all such changes or replacements should fall within the protection scope of the claims appended to the present disclosure.

What is claimed is:

1. A luminance adjustment method of a display panel, comprising following steps:
    obtaining a first luminance parameter of a first region of a target panel and a second luminance parameter of a second region of the target panel;
    when a first difference between the first luminance parameter and the second luminance parameter is greater than or equal to a first threshold, obtaining a first operating temperature of the first region of the target panel and a second operating temperature of the second region of the target panel;
    when a second difference between the first operating temperature and the second operating temperature is greater than or equal to a second threshold, obtaining a correlation of luminance to temperature, and obtaining a luminance compensation parameter of the first region or the second region according to the second difference and the correlation of the luminance to the temperature;
    compensating luminance of the first region or the second region according to the luminance compensation parameter of the first region or second region.

2. The luminance adjustment method according to claim 1, wherein the step of obtaining the first operating temperature of the first region of the target panel and the second operating temperature of the second region of the target panel comprises following steps:
    obtaining a plurality of first measured temperatures of the first region of the target panel and a plurality of second measured temperatures of the second region of the target panel using a temperature detection unit during a current measurement period;
    processing the plurality of first measured temperatures and the plurality of second measured temperatures using a mathematical model to obtain the first operating temperature of the first region of the target panel during the current measurement period and the second operating temperature of the second region of the target panel during the current measurement period.

3. The luminance adjustment method according to claim 2, wherein the step of obtaining the plurality of first measured temperatures of the first region of the target panel and the plurality of second measured temperatures of the second region of the target panel using a temperature detection unit comprises:
    during a measurement period of 30 seconds, obtaining 15 first measured temperatures of the first region of the target panel and 15 second measured temperatures of the second region of the target panel with a temperature detection unit at a time interval of 2 seconds.

4. The luminance adjustment method according to claim 2, wherein the step of processing the plurality of first measured temperatures and the plurality of second measured temperatures using the mathematical model comprises:
removing a maximum measured temperature and a minimum measured temperature from the plurality of first measured temperatures to obtain a first group of measured temperatures, and removing a maximum measured temperature and a minimum measured temperature from the plurality of second measured temperatures to obtain a second group of measured temperatures; and
taking an average value of the first group of measured temperatures as the first operating temperature of the first region during the current measurement period, and taking an average value of the second group of measurement temperatures as the second operating temperature of the second region during the current measurement period.

5. The luminance adjustment method according to claim 1, wherein the step of obtaining the correlation of the luminance to the temperature comprises following steps:
obtaining luminance parameters of the first region and the second region of a plurality of test panels at different operating temperatures;
obtaining luminance compensation parameters corresponding to the different operating temperatures according to the luminance parameters of different regions;
obtaining a correlation curve between operating temperatures and the luminance compensation parameters of the plurality of test panels according to the luminance compensation parameters corresponding to the different operating temperatures;
obtaining the correlation of the luminance to the temperature according to the correlation curve between the operating temperatures and the luminance compensation parameters of the plurality of test panels.

6. The luminance adjustment method according to claim 5, wherein the step of obtaining the luminance compensation parameters corresponding to the different operating temperatures according to the luminance parameters of the different regions comprises:
obtaining a luminance value $L_1$ of the first region and a luminance value $L_2$ of the second region;
obtaining grayscale compensation values corresponding to the different operating temperatures according to a formula $B=(L_1/L_2)^{(1/2.2)}*255-255$, wherein a parameter B is a grayscale compensation value.

7. The luminance adjustment method according to claim 5, wherein before the step of obtaining the luminance compensation parameters corresponding to the different operating temperatures according to the luminance parameters of the different regions, the luminance adjustment method further comprises following steps:
obtaining a measured luminance peak value of the plurality of test panels;
adjusting measured luminance peak values of the plurality of test panels to a target luminance peak value according to a compensation peak value of the luminance compensation parameters;
setting the target luminance peak value as a luminance peak value of the target panel.

8. The luminance adjustment method according to claim 7, wherein the steps of obtaining the measured luminance peak value of the plurality of test panels and adjusting the measured luminance peak values of the plurality of test panels to the target luminance peak value according to the compensation peak value of the luminance compensation parameters comprises:
obtaining a measured luminance peak value Lmax of the plurality of test panels and a compensated peak value Bmax of the luminance compensation parameters;
adjusting the measured luminance peak values of the plurality of test panels to the target luminance peak value according to a formula $BT=((255+Bmax)/255)^{2.2}*Lmax$, wherein a parameter BT is the target luminance peak value.

9. The luminance adjustment method according to claim 1, wherein the target panel comprises a functional addition area and an active area on a periphery of the functional addition area, the step of obtaining the first luminance parameter of the first region of the target panel and the second luminance parameter of the second region of the target panel comprises:
obtaining a first luminance parameter of the target panel in the functional addition area;
obtaining a second luminance parameter of the target panel at any position in the active area.

10. The luminance adjustment method according to claim 9, wherein the first luminance parameter and the second luminance parameter comprise a luminance value, a grayscale, a grayscale voltage, or a pixel voltage.

11. A luminance adjustment device of a display panel, comprising:
a luminance obtaining unit configured to obtain a first luminance parameter of a first region of a target panel and a second luminance parameter of a second region of the target panel;
a temperature obtaining unit configured to obtain a first operating temperature of the first region of the target panel and a second operating temperature of the second region of the target panel when a first difference between the first luminance parameter and the second luminance parameter is greater than or equal to a first threshold;
a signal processing unit configured to, when a second difference between the first operating temperature and the second operating temperature is greater than or equal to a second threshold value, obtain a correlation of luminance to temperature and a luminance compensation parameter of the first region or the second region according to the correlation of the luminance to the temperature and the second difference value;
a compensation range register configured to store the luminance compensation parameter of the first region or the second region;
a luminance compensation unit configured to compensate luminance of a corresponding first region or a corresponding second region according to the luminance compensation parameter of the first region or the second region.

12. The luminance adjustment device according to claim 11, wherein the luminance adjustment device is further configured to: obtain a plurality of first measured temperatures of the first region of the target panel and a plurality of second measured temperatures of the second region of the target panel by a temperature detection unit during a current measurement period; process the plurality of first measured temperatures and the plurality of second measured temperatures using a mathematical model to obtain the first operating temperature of the first region of the target panel within the current measurement period and the second operating temperature of the second region of the target panel within the current measurement period.

13. The luminance adjustment device according to claim 12, wherein the luminance adjustment device is further configured to, within a measurement period of 30 seconds, obtain 15 first measured temperatures of the first region of the target panel and 15 second measured temperatures of the second region of the target panel with the temperature detection unit at a time interval of 2 seconds.

14. The luminance adjustment device according to claim 12, wherein the luminance adjustment device is further configured to remove a maximum measured temperature and a minimum measured temperature from the plurality of first measured temperatures to obtain a first group of measured temperatures, and remove a maximum measured temperature and a minimum measured temperature from the plurality of second measured temperatures to obtain a second group of measured temperatures; take an average of the first group of measured temperatures as the first operating temperature of the first region during the current period, and take an average of the second group of measured temperatures as the second operating temperature of the second region during the current period.

15. The luminance adjustment device according to claim 11, wherein the luminance adjustment device is further configured to: obtain luminance parameters of the first region and the second region of a plurality of test panels at different operating temperatures; obtain luminance compensation parameters corresponding to the different operating temperatures according to luminance parameters of different regions; obtain a correlation curve between the operating temperatures and the luminance compensation parameters of the plurality of test panels according to the luminance compensation parameters corresponding to the different operating temperatures; and obtain the correlation of the luminance to the temperature according to the correlation curve between the operating temperatures and the luminance compensation parameters of the plurality of test panels.

16. The luminance adjustment device according to claim 15, wherein the luminance adjustment device is further configured to: obtain a luminance value $L_1$ of the first region and a luminance value $L_2$ of the second region; and obtain grayscale compensation values corresponding to the different operating temperatures according to a formula $B=(L_1/L_2)^{\wedge}(1/2.2)*255-255$, wherein a parameter B is a grayscale compensation value.

17. The luminance adjustment device according to claim 15, wherein the luminance adjustment device is further configured to: obtain a measured luminance peak value of the plurality of test panels; adjust measured luminance peak values of the plurality of test panels to a target luminance peak value according to a compensation peak value of the luminance compensation parameters; and set the target luminance peak value of the test panels as a luminance peak value of the target panel.

18. The luminance adjustment device according to claim 17, wherein the luminance adjustment device is further configured to: obtain a measured luminance peak value Lmax of the plurality of test panels and a compensation peak value Bmax of the luminance compensation parameters; adjust the measured luminance peak values of the plurality of test panels to the target luminance peak value according to a formula $BT=((255+Bmax)/255)^{\wedge}2.2*Lmax$, wherein a parameter BT is the target luminance peak value.

19. The luminance adjustment device according to claim 11, wherein the luminance adjustment device is further configured to: obtain a first luminance parameter of a functional addition area of the target panel; and obtain a second luminance parameter at any position of an active area of the target panel.

20. The luminance adjustment device according to claim 19, wherein the first luminance parameter and the second luminance parameter comprise a luminance value, a grayscale, a grayscale voltage, or a pixel voltage.

* * * * *